Oct. 10, 1950     L. HEIDMANN     2,525,297
ALTERNATING CURRENT COMMUTATOR MACHINE
Filed Feb. 4, 1949     4 Sheets-Sheet 1

Inventor
Leon Heidmann
By Shoemaker & Mattare
Attorneys.

Inventor
Leon Heidmann
By Shoemaker & Mattare
Attorneys.

Oct. 10, 1950  L. HEIDMANN  2,525,297
ALTERNATING CURRENT COMMUTATOR MACHINE
Filed Feb. 4, 1949  4 Sheets-Sheet 4

Fig.13

Inventor
Leon Heidmann
By Shoemaker & Mattare
Attorneys

Patented Oct. 10, 1950

2,525,297

UNITED STATES PATENT OFFICE 2,525,297

ALTERNATING CURRENT COMMUTATOR MACHINE

Léon Heidmann, Jeumont, France, assignor to Forges et Ateliers de Constructions Electriques de Jeumont, Paris, France, a French body corporate Application February 4, 1949, Serial No. 74,523
In France February 5, 1948

12 Claims. (Cl. 318—244)

1

The present invention relates to improvements in commutator motors or generators for alternating current; it relates more particularly to the commutation of the current in such machines.

It is known that machines of this kind may comprise the well-known commutation poles. While those devices are theoretically sound for a direct current machine, they are in principle unsuited for alternating current machines, for the following reason:

The commutation pole induces in the winding section under commutation, because of its relative motion, an electromotive force proportional to the speed and the current, whereas with alternating current there is required in addition a so-called static component, which has to be proportional to the current but independent of the speed.

It follows, therefore, first that the current interrupted by the brush at the end of the commutation can only be nil for one particular speed, and secondly that there flows in the commutated section and in the brush an undesired current which is particularly important at low speeds.

These drawbacks become more marked at higher frequencies of supply.

In order to eliminate at least partially these fundamental drawbacks, it becomes necessary to reduce the frequency and the voltage of the machine, and further to adopt big commutators and a large number of brushes, particularly at higher frequencies.

Such means are not only insufficient, but particularly disastrous in single-phase traction motors, where the total length of the machines is limited by the track-width or gauge, so that practically the power of a motor is approximately in inverse proportion to the supply frequency.

It has been proposed to facilitate commutation in these commutator motors by the use of brushes sub-divided into two parts. About the year 1902 Marcel Deprez suggested generation of an alternating electro-motive force between those two parts, and in 1903 Marius Latour suggested connecting the two parts by a resistance. These means have proved to be insufficient and the present invention has for its object to provide a new or improved commutator machine utilizing these sub-divided brushes in a completed and developed arrangement so as to avoid the drawbacks pointed out above.

The present invention provides substantially sparkless commutation by closing the circuit of the commutated section of the revolving armature winding in which an electro-motive force is induced by the field magnet pole, through another section or coil which is stationary or fixed in space, and in which there is generated a second electro-motive force. The two electro-motive forces may be such that their geometrical or vector sum is very small or even nil, or else such that it presents any suitable value that may be desired.

In order to reduce the undesired circulating current which flows in the said fixed section and in the brush at the moment when that section is short-circuited, the invention provides for the application of suitable resistances or reactances, whereas the commutation of the fixed section is effected with the help of a suitable capacitance, the said resistances, reactances and capacitance being preferably arranged outside the armature.

The invention also provides for the use of sub-divided brushes, such as mentioned above, which co-operate with a commutator of a novel type, having some of its segments set back or lowered in relation to the brushes.

By solving in a very complete manner the problem of commutation, the invention allows in particular of obtaining the following advantages:

The commutators can be made of small size and consequently the machines may be designed to dimensions comparable with those of direct current machines.

The resistances or reactances, suitably arranged, allow of reducing the size of the commutation poles.

The resistances, reactances and capacitances, used in conformity with the invention, as well as the sections fixed in space and intended to facilitate commutation, can be arranged outside the machine proper.

Voltages of the same order as with direct current can be used.

It is thus possible to build machines of a power per unit as high as with direct current, and of equal bulk or size.

Other features and advantages of the invention will be more readily understood from the following description given with reference to the accompanying drawings, which represent examples of several embodiments of the invention. In these drawings—

Figure 1:
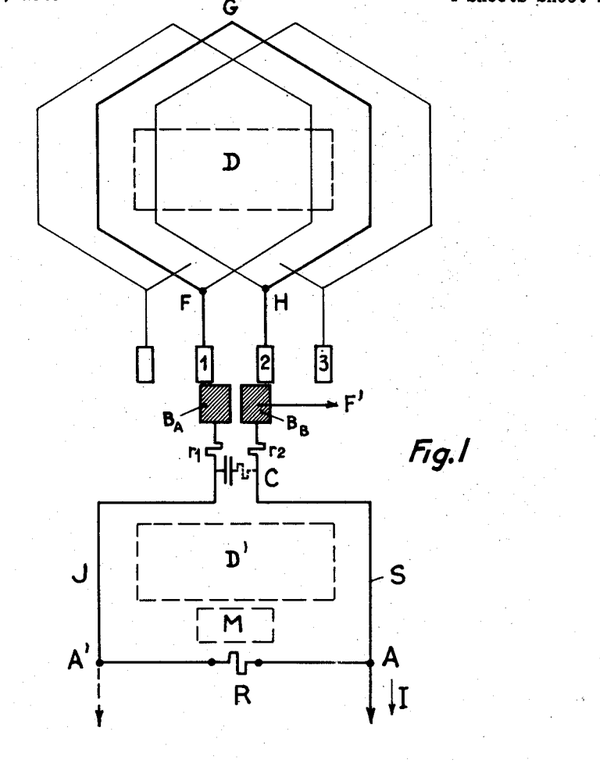
Fig. 1 is a diagram showing the principle of the invention, and Fig. 2 an explanatory diagram.

Fig. 1 represents diagrammatically the application of the invention to a lap-wound armature, with one coil per section of the winding, for example. The commutator segments 1 and 2 connected to the winding section G are separated by an interval equal for example to twice the angular width of a segment (including the corresponding insulation). Each complete brush is formed by two half-brushes $B_A$ and $B_B$, insulated from one another and arranged in such a way that—

The complete brush $B_AB_B$ can touch two commutator segments at the same time, but not three;

Each half-brush can occupy an inactive position between two adjacent segments 1 and 2, without touching them; and The two half-brushes $B_AB_B$ can be short-circuited by one commutator segment.

The two half-brushes $B_A$ and $B_B$ are connected together by a coil S fixed in space and embracing a magnetic circuit D' in which there is produced a flux which may be equal to and synchronous with the flux of the field magnet pole D of the machine.

The electro-motive force induced in the section G may be equal and opposite to the electro-motive force which is generated in the coil S by the flux of the magnetic circuit D'. This equality of the two opposite electro-motive forces is merely a particular case of application of the invention.

More generally, the alternating flux interlinked with the coil S may have a value and a phase such that the resultant electro-motive force, as well as the resultant current, will present suitable values and vary in a suitable manner.

The magnetic circuit D' may be formed by the field magnet pole D of the motor or generator. The fixed coil S may include a resistance R; a capacitance C is connected between the half-brushes $B_AB_B$.

In addition to the magnet pole D', there may be arranged in the interior of the coil S a second pole M, the function of which will be explained hereinafter.

The leakage inductance of the coil S is preferably negligible in relation to R, which is itself negligible in relation to $1/\omega C$. If the relative movement of the double brush is towards the right, along the arrow F', the external current flow takes place on the right at A. If the motor or generator reverses its direction, the current leaves at A', a suitable switch (not shown) being provided for this purpose.

Figs. 2a to 2g, which represent several successive positions of the double brush in relation to the commutator segments 1 and 2, allow of analyzing the various steps in the commutation of the fixed coil S and the revolving armature coil G.

In Fig. 2a, only the half-brush $B_B$ is in contact with the commutator: the armature current I passes wholly through the right-hand branch of the coil S, without traversing the resistance R. An electro-motive force is induced in the coil S which is closed by the capacitance C; the revolving coil G is not yet under commutation.

In Fig. 2b, the half-brushes $B_A$ and $B_B$ are short-circuited by the segment 1; the capacitance C is discharged. The discharge energy is developed in these two half-brushes at the moment of the closing of the short-circuit, and it is developed in proportion to their respective resistances at that moment: it therefore appears almost wholly in the brush $B_A$.

However, if resistances $r_1$ and $r_2$ are arranged as indicated in Fig. 1, a suitable fraction of this energy is dissipated in these two resistances. It is evidently possible to use only one resistance $r_1$. Instead of connecting these resistances as represented, it is likewise possible to arrange one beside the capacitance C, as indicated in dotted lines in Fig. 1.

The coil S delivers a current J due to the electro-motive force induced by the alternating flux of the magnetic circuit D'. This short-circuit current, limited by the resistance R, passes through the two half-brushes. The armature current I continues to pass wholly through the right-hand branch of the coil S, without traversing the resistance R; it is out of phase in relation to the current J.

In Fig. 2c, the half-brush $B_B$ has just left the segment 1. The current equal to the vector sum of the currents J and I is interrupted between the segment 1 and and the half-brush $B_B$ with the aid of the capacitance C which now becomes charged, and the armature current I passes from the right-hand branch to the left-hand branch of the coil S. Between the half-brushes $B_A$ and $B_B$ there appears therefore the resultant voltage of the static electro-motive force induced by the magnetic flux D', and the voltage drop R.I (neglecting the leakage reluctance of the fixed half-coil). These two voltage components are out of phase in relation to one another.

Without the capacitance C, this interruption of the currents J and I, and the appearance of the above voltage, would start an arc between the brushes $B_A$ and $B_B$. The capacitance C should therefore be large enough for the arc of interruption to be nil or negligible; it must on the other hand be such that the energy at its subsequent discharge shall not be excessive.

In Figs. 2d, 2e and 2f, the double brush connects the segments 1 and 2: the revolving armature coil G comes under commutation. Its circuit is closed by the coil S, including its resistance R, its capacitance C, and its static electro-motive force which may be approximately equal and opposite to the electro-motive force generated in the coil G. It follows from this that the revolving coil supplies through the brushes only a portion of the negligible current of the capacitance C.

It is seen therefore that the difficulty, due to the presence of a static voltage in the commutated coil, which difficulty appears in all alternating current machines, is eliminated.

On the other hand, the armature current I is transferred from the branch $B_AA$ to the branch $B_BA$ of the coil S, while, in the coil G, the current I/2 reverses direction from HGF to FGH. This means that in the initial state a current I is superposed, in the direction AFGHA, on the assembly of the two coils, whereby the desired commutation is achieved.

The generation of the current I may be, as in normal direct current machines, due to the action of commutation poles or compoles. But, in the arrangement represented, the resistance R contributes thereto in a very effective manner, to such an extent that in certain cases, the commutation poles may be omitted.

Figure 2:
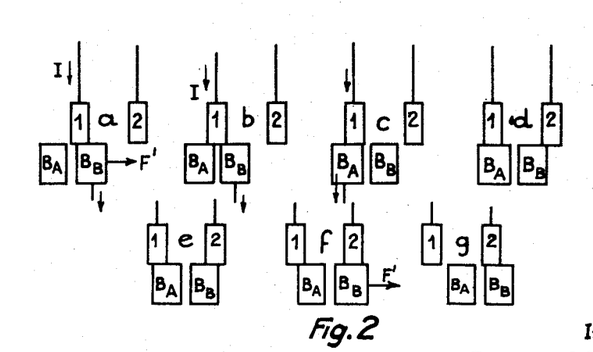

To sum up, the commutation of the fixed section S which is effected from the position 2a to the position 2e in Fig. 2, is obtained without objectionable sparking, this being due to the capacitance C, while the resistance R limits the short-circuit current in this section; the commutation of the revolving section G, which is effected from the position 2c to the position 2g, is obtained in the same conditions by means of the resistance R, and optionally of the commutation pole, if provided.

It is seen therefore that the invention allows of obtaining the following results: The commutator works without sparking, as in a direct current machine; the machine may in certain cases dispense with commutation poles.

It is to be noted that in the arrangement which has just been described, the commutator is not properly utilized in the circumferential direction, since it comprises, in the example considered, blanks representing two-thirds of its periphery.

Figure 3:
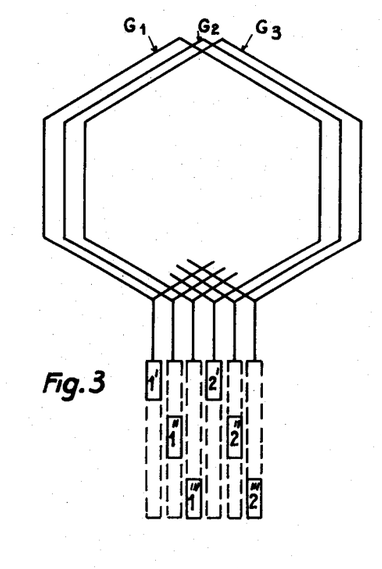
Fig. 3 reqresents a multiple armature winding, Figs. 4 to 6 showing the respective segments of the commutator, and Fig. 7 a suitable brush-assembly.

This drawback can be overcome by superposing on the machine several separate windings. For example, the machine may comprise, as shown in Fig. 3, three windings $G_1$, $G_2$ and $G_3$, spaced angularly in relation to one another by a third of the commutator pitch; the corresponding commutator segments $1$, $1'$, $1''$, $2$, $2'$, $2''$, etc. are staggered as shown by this same Fig. 3.

The arrangement thus carried out presents in addition the advantage of providing at the sides of the moving coil $G_1$ at the end of its commutation period (in the position of Fig. 2g) another coil $G_2$ which will be in the position of Fig. 2e, that is to say in a circuit closed by its own coil $S_2$; the interruption of the current at the end of commutation will thereby be facilitated.

These three completely independent windings $G_1$, $G_2$ and $G_3$ can be fed by three distinct power sources, formed for example by three secondary windings of a transformer. In this way, their balance is obtained without the use of equipotential connections; these latter may be used in the conventional manner, for the balancing of the parallel circuits of each winding. In order to fix the relative potential of each winding, it is possible for example to connect together properly selected points of the transformer in such a way that the potentials of the segments are graded regularly.

Figure 4:
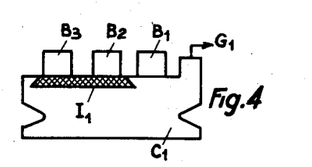
Figure 5:
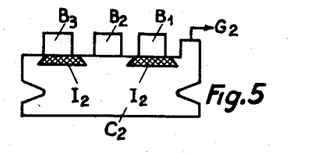
Figure 6:
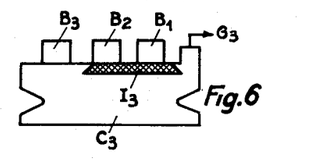

Each armature winding must be commutated by a separate set of double brushes, and in order that these sets of brushes may be able to act in a selective manner, the respective commutator segments may have the forms shown diagrammatically in Figs. 4 to 6.

The segment $C_1$ of Fig. 4 is adapted as shown to co-operate only with the brushes $B_1$ of the winding $G_1$, while its portions which pass under the brushes $B_2$ and $B_3$, provided for the windings $G_2$ and $G_3$, are set back or lowered and if desired covered by insulating parts $I_1$.

Similarly, the segment $C_2$ of Fig. 5 is arranged to co-operate solely with the brushes $B_2$ of the winding $G_2$, its other portions being set back or lowered and optionally insulated by parts $I_2$; the segment $C_3$ of Fig. 6, connected to the winding $G_3$, co-operates solely with the brushes $B_3$, its other portions being set back and insulated at I.

Figure 7:
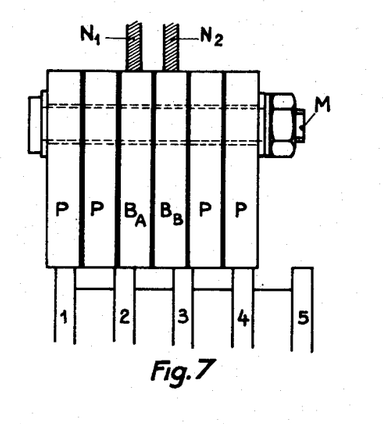

In order to ensure the smooth running of the sub-divided brushes upon the commutator they are made for example as shown in Fig. 7, where the double brush proper is formed by two half-brushes $B_A$ and $B_B$, to which current is conveyed by the flexible conductors $N_1$ and $N_2$. These half-brushes are connected together mechanically, but insulated electrically from one another, and on each side there may be fixed one or more supernumerary or dummy brushes P, insulated from one another; each of these brushes P is narrower than the space between two segments $1$, $2$, $3$, etc., of the commutator.

There is thus obtained an assembly of six brushes, for example, insulated from one another and assembled by an insulated bolt M, or by any other suitable means; this assembly bears at every moment upon four commutator segments at least.

As has been indicated above, only the brushes $B_A$ and $B_B$ are active; the others (P) serve only for mechanical guidance of the assembly and do not carry any current. The brush-holder would advantageously be of the "dog" type; it may be entirely made of metal due to the presence of the insulated dummy brushes.

The arrangements which have been described can be modified in various ways. It is possible, for example, to provide several modifications of the additional resistances $r_1$ and $r_2$ of Fig. 1. As has been stated above, they allow of discharging the capacitance C by the intermediary of the resistance $r_1+r_2$ and consequently of decreasing the energy to be dissipated in the brushes. The left-hand resistance $r_1$ should preferably be sufficiently low for the current $I+J$ to develop therein a fairly low voltage in order not to prejudice the interruption of this current by the brush $B_B$.

Instead of selecting $r_1=r_2$, which offers the advantage of symmetry, it is possible to have $r_1=0$, which gives the advantage of limited current, without the disadvantage of a more difficult interruption between the brushes and segments. But seeing that this arrangement is asymmetrical, it is then necessary to connect this single resistance sometimes on the right, sometimes on the left, according to the direction of running.

If the resistance is fairly high, it interferes with proper commutation of the coil G, but that can be remedied by inducing in the coil S a suitable additional electro-motive force by means of an additional flux in the magnetic circuit M represented in Fig. 1. Such additional flux can be produced for example by the armature current I, suitably out of phase, whereas the flux D' is produced by the field exciting current. In the case of series motors, the magnetic circuits D' and M can be combined in a single one and excited by the machine current, suitably shifted.

The excitation of the machine pole D and that of the magnetic circuit D' can likewise be obtained by a current which is independent of the armature current I, while retaining all the advantages of the invention. It follows therefore that the invention can be applied to machines with independent, shunt or compound fields, as well as to machines with series fields. In particular, series motors can operate with regeneration, provided they are given independent excitation.

The capacitance C can be formed by several elements of which some can be connected to the terminals of the resistance R in Fig. 1.

In the above embodiments, the capacitance C is short-circuited by the segment $1$ in the position shown in Fig. 2b. The interruption-spark which appears at this moment is damped by resistances, but they also act during the charging period of the capacitance, thereby reducing its efficiency. This drawback can be avoided by an arrangement shown in Figs. 8 to 12, in which the charging of the capacitance C is effected without resistances, that is to say with the maximum effectiveness for the elimination of break-sparks at the brushes, whereas its discharge is effected in series with a suitable resistance which damps the short-circuit current and reduces the corresponding spark sufficiently.

Figure 8:
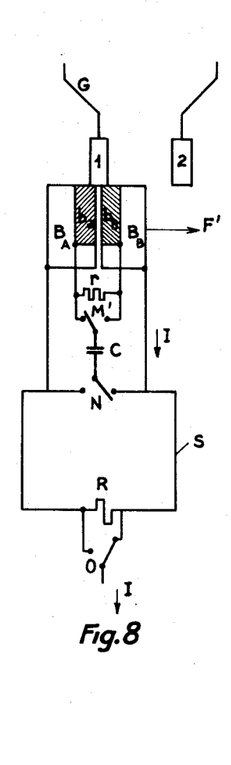
Figs. 8 to 11 show a modification.
Figure 10:
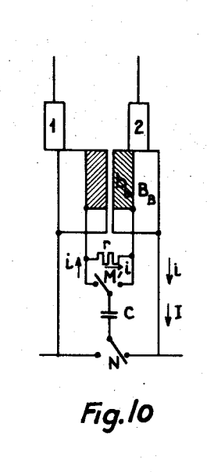
Figure 11:
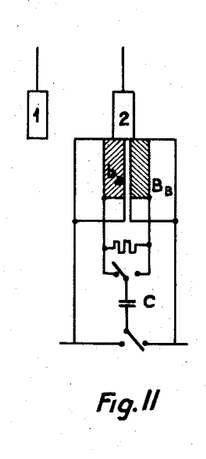
Figure 12:
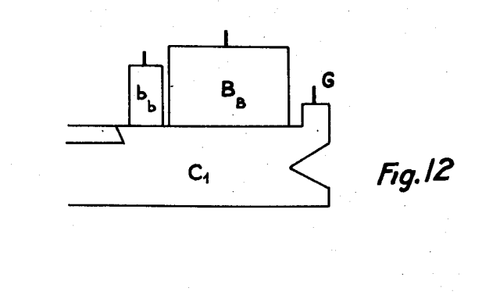
Fig. 12 being a detail of the corresponding brush arrangement.

As represented in Figs. 8 to 12, there are arranged for this purpose adjacent to the brushes $B_A$ and $B_B$ two auxiliary brushes $b_a$ and $b_b$. The connections of these auxiliary brushes are as shown in Fig. 8 and their relative position on the commutator is as shown in Fig. 12. Figs. 8 to 11 show the successive positions of the brushes in relation to the segments 1 and 2.

Between the auxiliary brushes $b_a$ and $b_b$, there are connected a resistance $r$ and the fixed contacts of a switch M' of which the movable two-position contact is connected to one terminal of the capacitance C; the other terminal of this latter is connected to a two-way switch N, as represented, in such a way as to connect the capacitance to the active conductor on the right or left of the fixed coil S, according to the direction of rotation of the motor. The external connection, at the bottom of Fig. 8, likewise connected according to the direction of rotation of the motor to one or other of the extremities of the resistance R, passes through a two-way switch O. The positions of the switches M', N and O, as represented correspond to the direction of rotation indicated by the arrow F' in Fig. 8.

In the position of the brushes corresponding to Fig. 8, the capacitance C is short-circuited, that is discharged, because the brushes $b_a$ and $b_b$ are both in contact with the segment 1.

Figure 9:
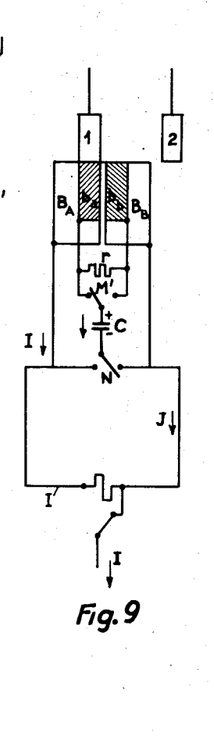

When the brushes reach the position of Fig. 9, the current is interrupted between the segment 1 and the brush $B_B$; the break-spark between these two parts is shunted by the capacitance C which is directly connected on one side to the brush $b^a$, that is to the segment 1, and on the other side to the brush $B_B$, so that the break-voltage produces the direct charging of the capacitance. It is seen that the resistance $r$ does not come into action during this charging action which takes place in a sudden and very effective way, suppressing completely the break-spark between the segment 1 and the brush $B_B$.

When the position of Fig. 10 is reached, the segment 2 closes the contact between the brushes $B_B$ and $b_b$. The discharge current $i$ of the capacitance C passes along the arrows through the circuit M', $r$, $b_b$, 2, $B_B$, N; it is therefore reduced by the resistance $r$ which may have a value sufficiently high to damp the spark at closure.

Fig. 11 represents the position equivalent to that of Fig. 8; in this position, when the brush $b_a$ reaches the segment 2, the discharge of the capacitance C is completed by a dead short-circuit.

From the foregoing explanation, it will be understood that the charging of the capacitance C is effected in a single stage and without intervention of the resistance $r$, whereas its discharge takes place in two stages: first in series with the resistance $r$ (Fig. 10) and then by short-circuit (Fig. 11). It follows that commutation sparking is practically suppressed.

When the motor has to revolve in the inverse direction, the switches M', N and O are all three set in the opposite positions, the system being symmetrical.

Figure 13:
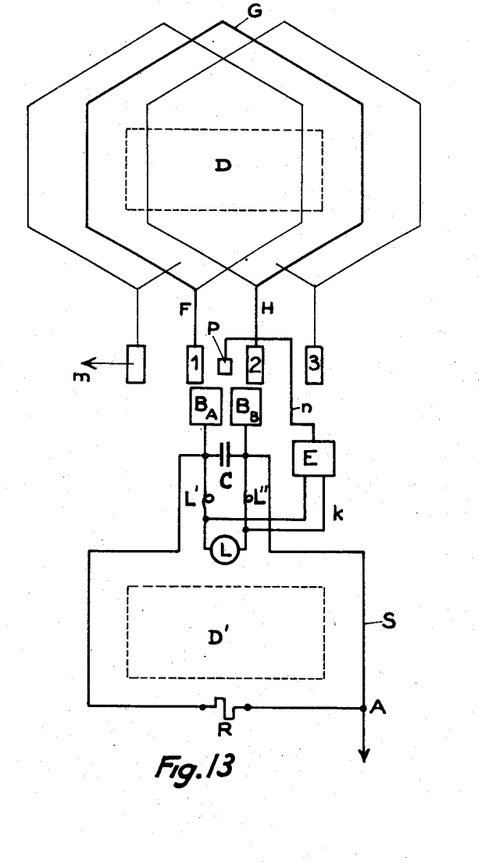
Fig. 13 illustrates diagrammatically another modification.

Fig. 13 represents digrammatically other means for eliminating the sparks which appear when the capacitance C is discharged by a short-circuit of the fixed coil S.

In this figure, there is seen an electronic discharge device L which is connected to the terminals of the capacitance C. This device may be a diode tube, having two cold electrodes in a low pressure gas, or a triode tube of the Thyratron or Ignitron type, or again by any other suitable electronic discharge device.

Whatever be its nature, the discharge device L must have such characteristics that the maximum voltage appearing at the terminals of the capacitance C is not sufficient to start its operation. The starting of the device L has to be effected very rapidly, at the appropriate moment, by an igniting device E having practically instantaneous operation. Once started or ignited, the device L must be able to carry relatively heavy currents of short duration. It must finally extinguish automatically when it is short-circuited by interconnection of the brushes $B_A$ and $B_B$.

In the case where the electronic discharge device L is a two electrode tube, the igniting device E may take the form of a generator of steepfronted impulses transmitted by the connections $k$ and sufficient to start the discharge between the electrodes of the device L. These impulses may be caused by a small pilot-brush $p$ at the moment when it comes into contact with a commutator segment.

In this case, reactances L' and L'' are interposed between the discharge tube L and the capacitance C, in such a way as to form obstacles to the passage of steepfronted waves towards the capacitance C. These reactances can have a very low value.

Assuming that the commutator segments 1, 2, 3, etc., travel in the direction of the arrow $m$ and that, in the position shown in Fig. 13, the capacitance C is charged, it is seen that the pilot-brush $p$ is in a position to establish a contact with the segment 2 before the half-brush $B_A$, that is, before the short-circuiting of the capacitance C and the coil S. As soon as the pilot-brush $p$ comes into contact with 2, it delivers by the lead $n$ a weak control impulse to the igniting device E; this latter immediately generates a steepfronted control impulse which is transmitted by the connections $k$ for starting the discharge device L.

It follows that at the next moment, when the brushes $B_A$ and $B_B$ are short-circuited by the segment 2, the capacitance C is sufficiently discharged, so that no spark appears at the brushes.

The short-circuiting of the half-brushes $B_A$ and $B_B$ has likewise for effect to stop the discharge in the tube L, if this discharge had a tendency to continue under low voltage.

In order to localize and to dissipate readily the heat which is evolved in the course of the discharges of the capacitance C, it is possible, if so required, to connect a suitable resistance in series with the one or more electronic discharge devices L.

In the case where three-electrode tubes are used the device L may be formed by two Thyratron, Ignitron or like tubes, mounted in reversed parallel, i. e. in opposite senses, so as to let the current pass in both directions; the arrangement and the control of these tubes can then be substantially like those utilized in Thyratron or other tubes controlling welding machines. As is known, these machines work with very heavy currents, and with remarkable precision. The igniting or starting device E can be in this case a single grid transformer with suitable characteristics.

As regards the location of the various elements of the commutator machines described above, it is to be noted that the fixed coils or windings S can be arranged wholly or in part upon the machine stator, or externally. The capacitances and resistances or reactances can be mounted wholly or partly outside the machine proper. The magnetic circuits D' and M may be common to all the fixed coils or windings S of the machine.

A more detailed analysis of the commutation phenomena shows that the presence of the flux M and resistance R allows of obtaining just as satisfactory commutation as with direct current machines, without relying upon the ohmic resistance of the brushes: the latter may therefore be of low resistance, which allows of increasing their loading.

It is to be noted that the invention and its modifications are applicable not only to single-phase machines, but also to polyphase commutator machines.

The invention thus provides for improved commutation in single and polyphase commutator machines, by superposing upon the electro-motive force generated in the commutated section of the armature winding, another electro-motive force which may be substantially equal and opposite to the first, this other electro-motive force being created by one or more fluxes some of which may be synchronous with and proportional to the flux of the field magnets, and being injected into the said commutated section by the intermediary of sub-divided brushes, in suppressing or sufficiently reducing, by suitable conveniently distributed impedances, the short-circuit currents appearing in the course of the commutation, and in practically suppressing commutator sparking by the provision of suitable capacitances.

In a more general manner, the invention operates by superposing upon the electro-motive force of a commutated section of the armature winding, another electro-motive force having a value and a phase such that, due to the effect of suitably disposed resistances, reactances and capacitances, the resultant voltage and the resultant current present the values and the variations desired for satisfactory commutation.

What I claim is:

1. In an alternating current electrical machine having a plurality of armature windings, a single commutator with widely spaced segments connected selectively to said armature windings, and brushes contacting with segments of said commutator, each brush being sub-divided into two closely spaced parts, and there being a separate set of said sub-divided brushes and a separate set of said commutator segments for each armature winding, means for ensuring substantially sparkless commutation comprising a stationary winding connected between the two parts of each sub-divided brush and interlinked with an alternating flux synchronous with and proportional to that of the machine poles, a commutation capacitance interconnected with each of said stationary windings in order to quench the sparks at interruption of the short-circuit currents, discharge-power limiting impedance means connected to said capacitance, an outgoing lead connected to each of said stationary windings, and a commutation impedance inserted between said outgoing lead and one part of the respective sub-divided brush, according to the direction of rotation of the machine.

2. In an alternating current electrical machine, having a plurality of armature windings, a single commutator with widely spaced segments connected selectively to said armature windings, and brushes contacting with segments of said commutator, each brush being sub-divided into two closely spaced parts, said commutator segments and sub-divided brushes forming separate sets for each of said armature windings, means for ensuring substantially sparkless commutation comprising a stationary winding connected between the two parts of each sub-divided brush and interlinked with an alternating flux synchronous with and proportional to that of the machine poles, a commutation capacitance interconnected with each of said stationary windings in order to quench the sparks at interruption of the short-circuit currents, discharge-power limiting impedance means connected to said capacitance, an outgoing lead connected to each of said stationary windings, a commutation impedance inserted between said outgoing lead and one part of the respective sub-divided brush, according to the direction of rotation of the machine, said sets of brushes being offset to one another in the axial direction of said commutator, and the sets of segments non-co-operative with each set of brushes being lowered from contact therewith, and means for guiding said sub-divided brushes over the lowered non-co-operative segments.

3. In an alternating current electrical machine having a plurality of armature windings, a single commutator with widely spaced segments connected selectively to said armature windings, and brushes contacting with segments of said commutator, each brush being sub-divided into two closely spaced parts, and there being a separate set of said sub-divided brushes and a separate set of said commutator segments for each armature winding, means for ensuring substantially sparkless commutation comprising a stationary winding connected between the two parts of each sub-divided brush and interlinked with an alternating flux synchronous with and proportional to that of the machine poles, said synchronous flux being furnished by a magnetic circuit of the machine, a commutation capacitance interconnected with each of said stationary windings in order to quench the sparks at interruption of the short-circuit currents, discharge-power limiting impedance means connected to said capacitance, an outgoing lead connected to each of said stationary windings, and a commutation impedance inserted between said outgoing lead and one part of the respective sub-divided brush, according to the direction of rotation of the machine.

4. In an alternating current electrical machine having a plurality of armature windings, a single commutator with widely spaced segments connected selectively to said armature windings, and brushes contacting with segments of said commutator, each brush being sub-divided into two closely spaced parts, and there being a separate set of said sub-divided brushes and a separate set of said commutator segments for each armature winding, means for ensuring substantially sparkless commutation comprising a stationary winding connected between the two parts of each sub-divided brush and interlinked with an alternating flux proportional to but dephased in relation to that of the machine poles, a commutation capacitance interconnected with each of said stationary windings in order to quench the sparks at interruption of the short-circuit currents, discharge-power limiting impedance means connected to said capacitance, an outgoing lead connected to each of said stationary windings, and a commutation impedance inserted between said outgoing lead and one part of the respective sub-divided brush, according to the direction of rotation of the machine.

5. In an alternating current electrical machine having a plurality of armature windings, a single commutator with widely spaced segments connected selectively to said armature windings, and brushes contacting with segments of said commutator, each brush being sub-divided into two closely spaced parts, and there being a separate set of said sub-divided brushes and a separate set of said commutator segments for each armature winding, means for ensuring substantially sparkless commutation comprising a stationary winding connected between the two parts of each sub-divided brush and interlinked with an alternating flux furnished by a magnetic circuit of the machine in conjunction with an auxiliary magnetic circuit furnishing an additional flux adjustable in phase relative to that furnished by the first-mentioned magnetic circuit, a commutation capacitance interconnected with each of said stationary windings in order to quench the sparks at interruption of the short-circuit currents, discharge-power limiting impedance means connected to said capacitance, an outgoing lead connected to each of said stationary windings, and a commutation impedance inserted between said outgoing lead and one part of the respective sub-divided brush, according to the direction of rotation of the machine.

6. In an alternating current electrical machine having a plurality of armature windings, a single commutator with widely spaced segments connected selectively to said armature windings, and brushes contacting with segments of said commutator, each brush being sub-divided into two closely spaced parts, and there being a separate set of said sub-divided brushes and a separate set of said commutator segments for each armature winding, means for ensuring substantially sparkless commutation comprising a stationary winding connected between the two parts of each sub-divided brush and interlinked with an alternating flux synchronous with and proportional to that of the machine poles, a commutation capacitance connected between the two parts of each sub-divided brush discharge-power limiting impedance means connected to said capacitance, an outgoing lead connected to each of said stationary windings, and a commutation impedance inserted between said outgoing lead and one part of the respecive sub-divided brush, according to the direction of rotation of the machine.

7. In an alternating current electrical machine having a plurality of armature windings, a single commutator with widely spaced segments connected selectively to said armature windings, and brushes contacting with segments of said commutator, each brush being sub-divided into two closely spaced parts, and there being a separate set of said sub-divided brushes and a separate set of said commutator segments for each armature winding, means for ensuring substantially sparkless commutation comprising a stationary winding connected between the two parts of each sub-divided brush and interlinked with an alternating flux synchronous with and proportional to that of the machine poles, a commutation capacitance and a discharge current limiting resistance connected in series between the two parts of each sub-divided brush, an outgoing lead connected to each of said stationary windings, and a commutation impedance inserted between said outgoing lead and one part of the respective sub-divided brush, according to the direction of rotation of the machine.

8. In an alternating current electrical machine having a plurality of armature windings, a single commutator with widely spaced segments connected selectively to said armature windings, and brushes contacting with segments of said commutator, each brush being sub-divided into two closely spaced parts, and there being a separate set of said sub-divided brushes and a separate set of said commutator segments for each armature winding, means for ensuring substantially sparkless commutation comprising a stationary winding connected between the two parts of each sub-divided brush and interlinked with an alternating flux synchronous with and proportional to that of the machine poles, a commutation capacitance connected to the ends of said stationary winding, a discharge current limiting resistance interposed between said stationary winding and each part of the respective sub-divided brush, an outgoing lead connected to each of said stationary windings, and a commutation impedance inserted between said outgoing lead and the respective sub-divided brush, according to the direction of rotation of the machine.

9. In an alternating current electrical machine having a plurality of armature windings, a single commutator with widely spaced segments connected selectively to said armature windings, and brushes contacting with segments of said commutator, each brush being sub-divided into two closely spaced parts, and there being a separate set of said sub-divided brushes and a separate set of said commutator segments for each armature winding, means for ensuring substantially sparkless commutation comprising a stationary winding connected between the two parts of each sub-divided brush and interlinked with an alternating flux synchronous with and proportional to that of the machine poles, two auxiliary brushes aligned with the two parts of each sub-divided brush and co-operating with the same segments of said commutator as the respective parts of said brush, a resistance connected between said auxiliary brushes, a commutation capacitance inserted between one of said auxiliary brushes and the part of the sub-divided brush aligned with the other of said auxiliary brushes, switching means for selecting according to the direction of rotation of the machine the auxiliary brush and sub-divided brush part to which said capacitance is connected, an outgoing lead connected to each of said stationary windings, and a commutation impedance inserted between said outgoing lead and the respective sub-divided brush, according to the direction of rotation of the machine.

10. In an alternating current electrical machine having a plurality of armature windings, a single commutator with widely spaced segments connected selectively to said armature windings, and brushes contacting with segments of said commutator, each brush being sub-divided into two closely spaced parts, and there being a separate set of said sub-divided brushes and a separate set of said commutator segments for each armature winding, means for ensuring substantially sparkless commutation comprising a stationary winding connected between the two parts of each sub-divided brush and interlinked with an alternating flux synchronous with and proportional to that of the machine poles, two auxiliary brushes aligned with the two parts of each sub-divided brush and co-operating with the same segments of said commutator as the respective parts of said brush, a resistance connected between said auxiliary brushes, a commutation capacitance conected according to the direction of rotation of the machine between one of said auxiliary brushes and one part of the respective sub-divided brush, whereby said resistance remains in circuit only during the discharge of said capacitance, an outgoing lead connected to each of said stationary windings, and a commutation impedance inserted between said outgoing lead and the respective sub-divided brush, according to the direction of rotation of the machine.

11. In an alternating current electrical machine having a plurality of armature windings, a single commutator with widely spaced segments connected selectively to said armature windings, and brushes contacting with segments of said commutator, each brush being sub-divided into two closely spaced parts, and there being a separate set of said sub-divided brushes and a separate set of said commutator segments for each armature winding, means for ensuring substantially sparkless commutation comprising a stationary winding connected between the two parts of each sub-divided brush and interlinked with an alternating flux synchronous with and proportional to that of the machine poles, a commutation capacitance inserted between the ends of each of said stationary windings, electronic discharge means connected in parallel with said capacitance, means controlled by segments of said commutator for igniting said electronic discharge means to discharge said capacitance periodically, an outgoing lead connected to each of said stationary windings, and a commutation impedance inserted between said outgoing lead and the respective sub-divided brush, according to the direction of rotation of the machine.

12. In an alternating current electrical machine having a plurality of armature windings, a single commutator with widely spaced segments connected selectively to said armature windings, and brushes contacting with segments of said commutator, each brush being sub-divided into two closely spaced parts, and there being a separate set of said sub-divided brushes and a separate set of said commutator segments for each armature winding, means for ensuring substantially sparkless commutation comprising a stationary winding connected between the two parts of each sub-divided brush and interlinked with an alternating flux synchronous with and proportional to that of the machine poles, a commutation capacitance inserted between the ends of each of said stationary windings, electronic discharge means connected in parallel with said capacitance, means controlled by segments of said commutator for igniting said electronic discharge means to discharge said capacitance periodically, said igniting means comprising a pilot-brush engaging with segments of said commutator and an igniting device controlled by current impulses from said pilot-brush, an outgoing lead connected to each of said stationary windings, and a commutation impedance inserted between said outgoing lead and the respective sub-divided brush, according to the direction of rotation of the machine.

LÉON HEIDMANN.

REFERENCES CITED

The following references are of record in the file of this patent:

UNITED STATES PATENTS

| Number | Name | Date |
|---|---|---|
| 837,889 | Seyfert | Dec. 4, 1906 |
| 1,393,141 | Kostko | Oct. 11, 1921 |
| 2,152,327 | Ranhut | Mar. 28, 1939 |